(12) United States Patent
Miao et al.

(10) Patent No.: US 8,559,466 B2
(45) Date of Patent: Oct. 15, 2013

(54) SELECTING DISCARD PACKETS IN RECEIVER FOR VOICE OVER PACKET NETWORK

(75) Inventors: Kai X. Miao, Boonton Township, NJ (US); Siu H. Lam, Woodcliff Lake, NJ (US); Ling Chen, Livingston, NJ (US)

(73) Assignee: Intel Corporation, Santa Clara, CA (US)

( * ) Notice: Subject to any disclaimer, the term of this patent is extended or adjusted under 35 U.S.C. 154(b) by 2160 days.

(21) Appl. No.: 10/952,071

(22) Filed: Sep. 28, 2004

(65) Prior Publication Data

US 2006/0072576 A1 Apr. 6, 2006

(51) Int. Cl.
*H04J 3/16* (2006.01)

(52) U.S. Cl.
USPC ........... 370/516; 370/394; 370/229; 370/352; 370/232; 370/235; 370/252

(58) Field of Classification Search
USPC ......... 370/394, 229, 516, 352, 232, 235, 252, 370/253
See application file for complete search history.

(56) References Cited

U.S. PATENT DOCUMENTS

| | | | | |
|---|---|---|---|---|
| 4,514,703 A * | 4/1985 | Maher et al. | ................... | 330/279 |
| 6,452,950 B1 * | 9/2002 | Ohlsson et al. | ............... | 370/516 |
| 6,522,746 B1 * | 2/2003 | Marchok et al. | ......... | 379/406.03 |
| 6,658,027 B1 * | 12/2003 | Kramer et al. | ................ | 370/516 |
| 6,665,317 B1 * | 12/2003 | Scott | ............................. | 370/516 |
| 6,879,583 B2 * | 4/2005 | Hoffmann | ...................... | 370/352 |
| 7,058,568 B1 * | 6/2006 | Lewis | ........................... | 704/214 |
| 7,099,486 B2 * | 8/2006 | Julstrom et al. | .............. | 381/331 |
| 7,099,820 B1 * | 8/2006 | Huart et al. | .................... | 704/207 |
| 7,123,607 B2 * | 10/2006 | Yokoyama et al. | ........... | 370/352 |
| 7,243,065 B2 * | 7/2007 | Stephens et al. | .............. | 704/226 |
| 7,266,127 B2 * | 9/2007 | Gupta et al. | .................. | 370/413 |
| 2005/0227657 A1 * | 10/2005 | Frankkila et al. | ............. | 455/255 |

* cited by examiner

*Primary Examiner* — Kibrom T Hailu
(74) *Attorney, Agent, or Firm* — Buckley, Maschoff & Talwalkar LLC

(57) ABSTRACT

A method includes receiving at a receiver a voice signal in the form of a sequence of data packets, and using an automatic level control (ALC) component of the receiver to detect that one of the received packets is a silence packet or a noise packet. The method further includes receiving at a jitter delay control circuit from the ALC component a signal or signals to indicate that the one of the received packets is a silence or a noise packet, and dropping the one of the received packets in response to the signal or signals received from the ALC component. The ALC component includes a gain adjustment block and a level estimation and active voice detector block. The gain adjustment block is controlled by the level estimation and active voice detector block to adjust a gain applied by the gain adjustment block to an audio signal.

4 Claims, 5 Drawing Sheets

SELECTING DISCARD PACKETS IN RECEIVER FOR VOICE OVER PACKET NETWORK

BACKGROUND

In Voice over Packet (VoP) telephony applications, a voice signal is transmitted in the form of data packets at a predetermined frame rate, such as one packet for every 10 milliseconds. It sometimes is necessary to discard an occasional packet at the receiver of a VoP connection. This may occur, for example, if the local clock at the receiver is slightly slower than the transmitter clock, or if the jitter delay needs to be reduced due to, e.g., a change in network conditions.

Dropping a packet at the receiver has the potential of causing an audible glitch in the output audio signal, since the pitch period of the audio signal is not synchronous with the frame rate. It is therefore desirable to perform packet drops during periods of silence, when no adverse effect on sound quality will occur.

DETAILED DESCRIPTION

Figure 1:
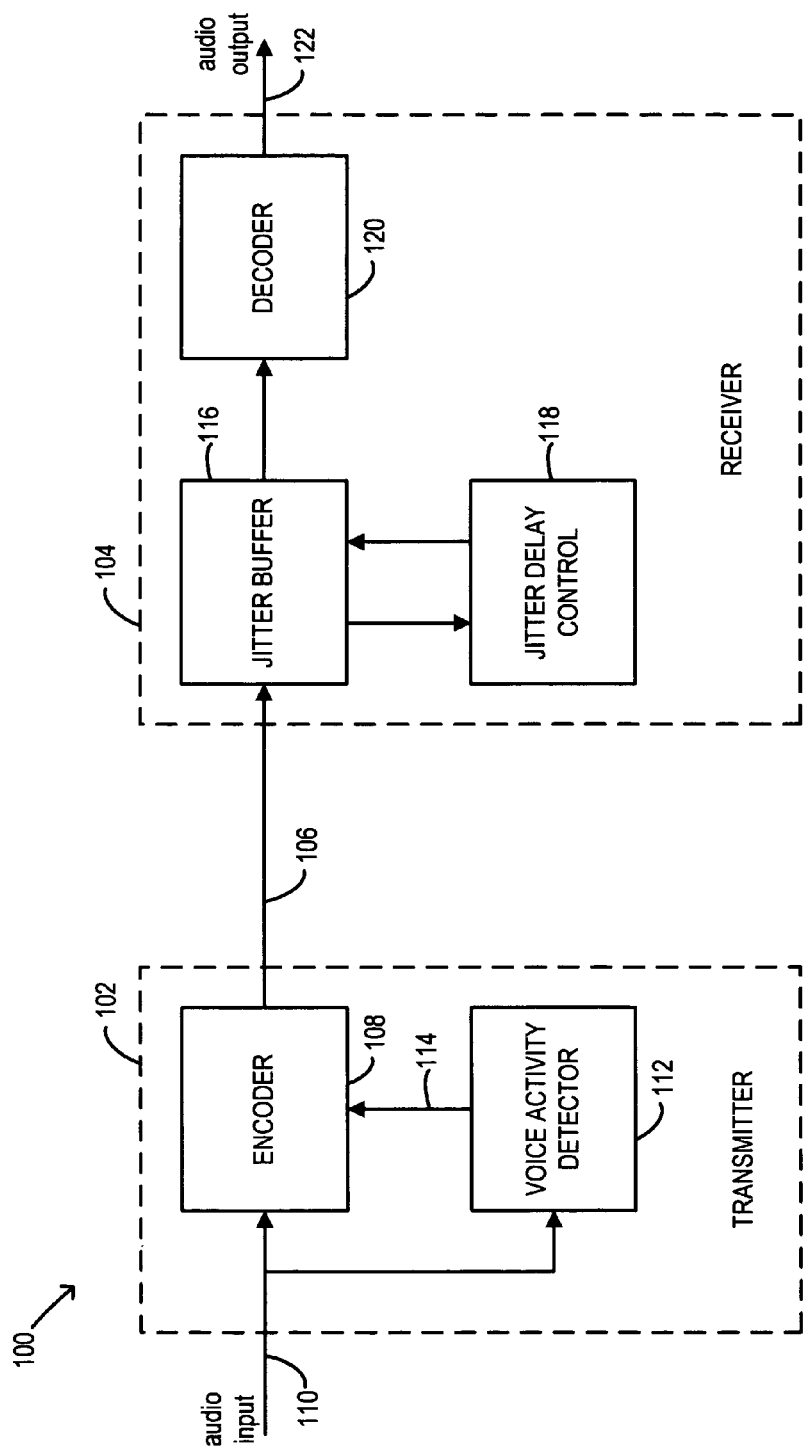
FIG. 1 is block diagram of a VoP network connection according to some embodiments.

FIG. 1 is a block diagram of a VoP network connection 100 according to some embodiments. The VoP network connection 100 is formed of a VoP transmitter 102, a VoP receiver 104, and a data communication channel 106 by which a sequence of voice signal data packets are transmitted from the transmitter 102 to the receiver 104. The data communication channel 106 may be provided, for instance, via a data communication network such as the Internet. The packets may be formed in accordance with a standard format (e.g., in accordance with the well-known RTP—"real time protocol"—used for transport of real time data over the Internet) and include header data as well as data which corresponds to the audio input signal.

The transmitter 102 may be part of a PSTN-IP (public switched telephone network/Internet protocol) gateway device, which is not shown apart from the transmitter 102. The transmitter 102 includes an encoder 108 which receives a voice signal in the form of an audio input signal 110 and converts the audio input signal into a sequence of data packets for transmission to the receiver 104 via the communication channel 106. The transmitter 102 also includes a voice activity detector 112 which also receives the audio input signal 110 and which is coupled to the encoder 108, as indicated at 114.

The voice activity detector 112 may operate in accordance with conventional practices to determine when the audio input signal contains voice activity. Further in accordance with conventional practices, the transmitter may operate in a silence suppression mode, in which packets that contain only silence (i.e., do not contain voice activity) are not transmitted. In such cases, a voice activity marker bit is set in the header of the first packet which contains voice after a silence period. The suppression of silence packets and setting of the voice activity marker bit both may be controlled in response to output from the voice activity detector.

In accordance with some embodiments, the voice activity marker bit may also be set after periods of silence even when the transmitter is not operating in the silence suppression mode. Thus, the voice activity marker bit is set in the first packet containing voice activity transmitted by the transmitter 102 immediately after transmission of one or more packets which correspond to a period of silence in the input audio signal. As will be seen, the voice activity marker bit may be used at the receiver 104 in accordance with some embodiments to control selection of data packets for dropping at the receiver 104.

The receiver may be part of a PSTN-IP gateway device, which is not separately shown. The receiver 104 includes a jitter buffer 116 which is coupled to the communication channel 106 to receive and store the sequence of voice signal data packets transmitted from the transmitter 102 via the communication channel 106. Thus the jitter buffer 116 operates to buffer the sequence of data packets received at the receiver 104.

The receiver 104 also includes a jitter delay control circuit 118 which is coupled to the jitter buffer and operates in accordance with some embodiments in a manner which is described below.

The receiver 104 further includes a decoder 120 which is coupled to the jitter buffer 116. The decoder 120 converts a sequence of voice signal data packets received by the decoder 120 from the jitter buffer 116 into an audio output signal 122. The decoder 120 may operate in accordance with conventional practices.

Figure 2:
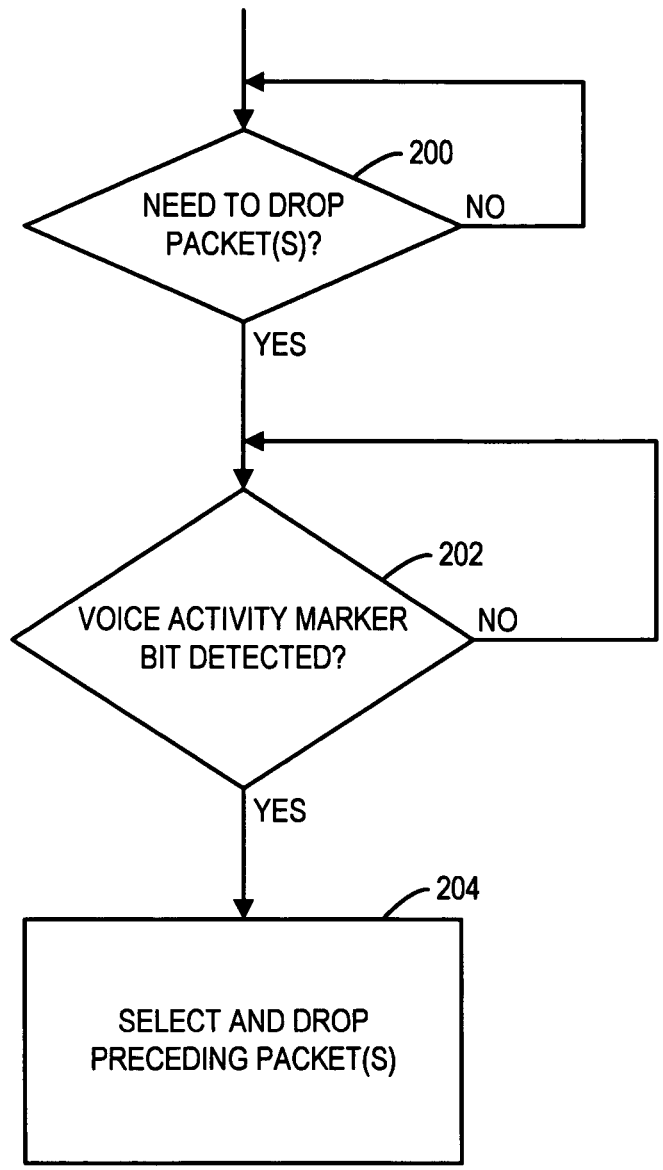
FIG. 2 is a flow chart that illustrates a process performed in a receiver that is part of the VoP network connection of FIG. 1.

FIG. 2 is a flow chart that illustrates a process that may be carried out by the receiver 104 (and particularly by the jitter delay control circuit 118) in accordance with some embodiments.

As noted above, it may sometimes be necessary to drop packets at the receiver 104 because of, e.g., slight clock rate mismatches or a need to decrease the jitter delay at the jitter buffer 116 due to changes in network conditions. The process illustrated in FIG. 2 is concerned with selection of packets to be dropped in accordance with some embodiments. As used herein and in the appended claims, "dropping" a packet at the receiver refers to excluding all or part of the packet from a sequence of packets used to generate an audio output at the receiver. For example, a packet may be dropped by omitting the packet from the sequence of packets read out from the jitter buffer 116 to the decoder 120 for conversion into the output audio signal 122.

As indicated at 200 in FIG. 2, the receiver 104 (e.g., the jitter delay control circuit 118) may determine whether it is currently necessary to drop one or more of the received voice signal data packets. If so, the jitter delay control circuit 118 may read at least some of the bits in the headers of at least some of the packets stored in the jitter buffer 116 to determine whether the voice activity marker bit has been set with respect to one of the packets stored in the jitter buffer 116. Thus, as indicated at 202 in FIG. 2, the jitter delay control circuit 118 may detect the voice activity marker bit in one of the packets stored in the jitter buffer 116. If need be, the jitter delay control circuit may operate to wait for a packet having the voice activity marker bit to be received before selecting a packet or packets for dropping.

In response to the detected voice activity marker bit, the jitter delay control circuit 118 may select one or more packets stored in the jitter buffer 116 which immediately precede in the sequence of received packets the packet which has the header in which the voice activity marker bit was detected. The jitter delay control circuit 118 may then operate so that the selected packet or packets are dropped. For example, the jitter delay control circuit 118 may control the jitter buffer 116 so that the selected packet or packets are not read out from the jitter buffer 116 to the decoder 120 for conversion into the audio output signal 122. Thus the decoder 120 generates the audio output signal from the sequence of data packets stored in the jitter buffer 116 less the dropped packet or packets. Selection and dropping of a packet or packets as described in this paragraph is represented by block 204 in FIG. 2.

Because the voice activity marker bit signifies the beginning of voice activity following a period of silence, it may be assumed that a packet or packets which immediately precede the packet having the marker bit correspond to a period of silence. Thus selecting such packet or packets for dropping is unlikely to result in a glitch in the audio output signal, so that the audio quality perceived by a user at the receiver side of the VoP connection 100 may be improved.

In some embodiments, silence detection for the purposes of setting the marker bit at the transmitter 102 may be performed by a transmitter component other than the voice activity detector 112 used for silence suppression. For example, the transmitter 102 may include an automatic gain control (AGC) circuit (not shown) which may provide an energy calculation for the input audio, and the energy calculation may be used to distinguish between silence and speech. Alternatively, a codec (not separately shown) of which the encoder 108 is a part may have a capability to detect silence, and this capability may be used to set the voice activity marker bit.

In some embodiments, the voice activity marker bit may be set only after detecting a period of silence that is sufficiently long to support dropping of packets at the receiver.

It will be appreciated that the transmitter 102 may be part of a device (not separately shown) which also includes a receiver like the receiver 104, and the receiver 104 may be part of a device (not separately shown) which includes a transmitter like the transmitter 102, so that a two-way telephone connection may be made.

Figure 3:
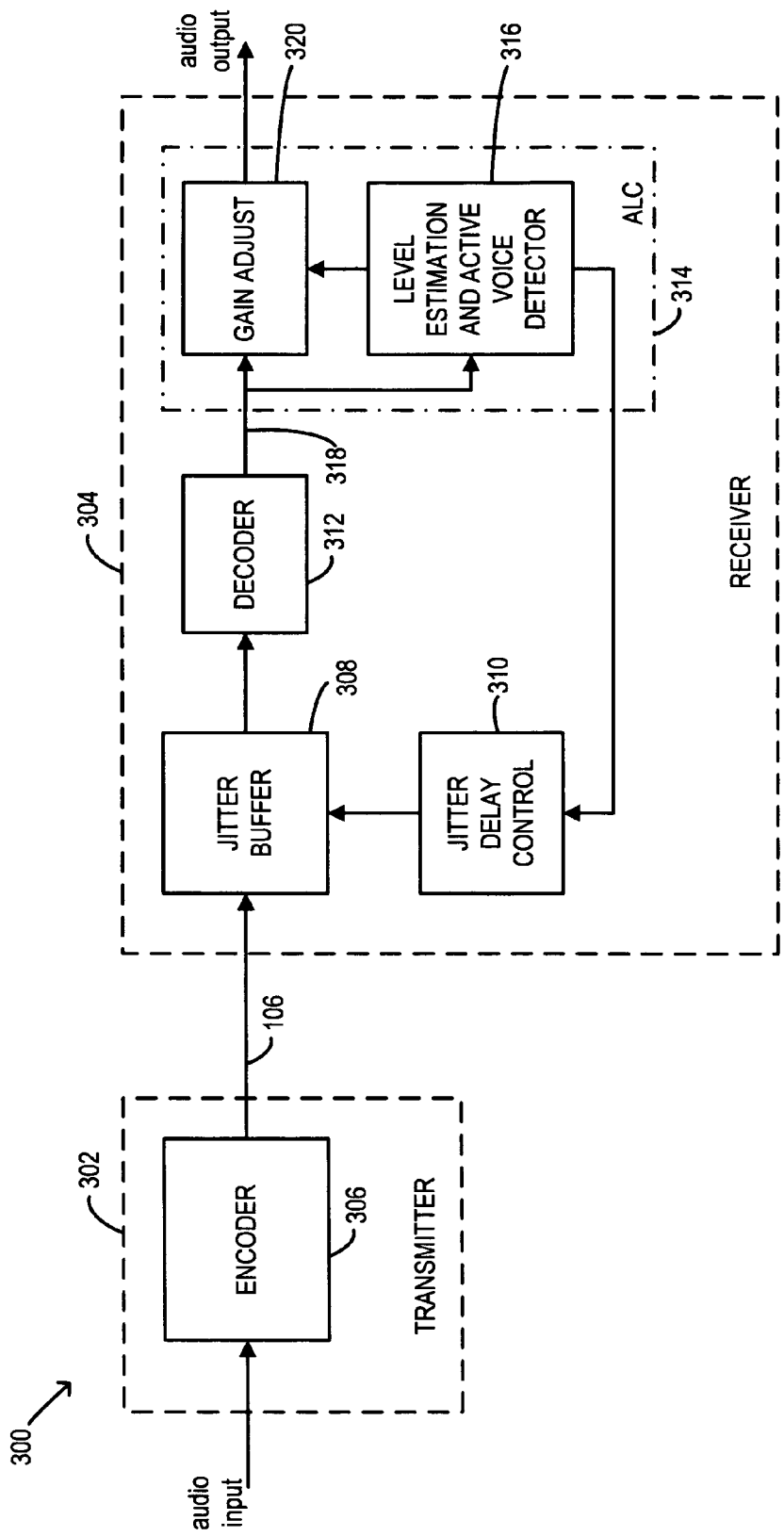
FIG. 3 is a block diagram of a VoP network connection according to some other embodiments.

FIG. 3 is a block diagram of a VoP network connection 300 according to some other embodiments. The VoP network connection 300 is formed of a VoP transmitter 302, a VoP receiver 304 and a data communication channel (which is again indicated by reference numeral 106, since it may be the same as the data communication channel discussed in connection with FIG. 1). As before, a sequence of voice signal data packets may be transmitted via the data communication channel 106 from the transmitter 302 to the receiver 304, and the packets may be in the RTP format, for example.

Again the transmitter 302 may be part of a PSTN-IP gateway device (not separately shown). The transmitter 302 includes an encoder 306 which may be like the encoder described in connection with FIG. 1. The transmitter may, but need not, include a voice activity detector, which is not shown in FIG. 3. The transmitter may operate entirely in accordance with conventional practices.

The receiver 304 may also be part of a PSTN-IP gateway device, which is not separately shown. The receiver 304 includes a jitter buffer 308, which may be like the jitter buffer described in connection with FIG. 1. The receiver 304 also includes a jitter delay control circuit 310 which is coupled to the jitter buffer 308 and operates in accordance with some embodiments in a manner which is described below. The receiver 304 further includes a decoder 312 which is coupled to the jitter buffer 308 and which may be like the decoder described in connection with FIG. 1.

In addition, the receiver 304 may include an automatic level control (ALC) component 314 which is coupled to the decoder 312 and to the jitter delay control circuit 310. The ALC component 314 may include a level estimation and active voice detector block 316 which is coupled to the decoder 312 to receive and analyze the output audio signal 318 generated by the decoder 312. As will be seen, the level estimation and active voice detector block 316 may also be coupled to the jitter delay control circuit 310 to provide an output to the jitter delay control circuit 310.

In addition, the ALC component 314 may include a gain adjustment block 320 which is coupled to the output of the decoder 318 and is controlled by the level estimation and active voice detector block 316. In accordance with conventional practices, the level estimation and active voice detector block 316 receives and analyzes the output audio signal 318 produced by the decoder 312 to determine the signal amplitude level and also to detect the presence of speech in the output audio signal 318. The level estimation and active voice detector block 316 controls the gain adjustment block 320 to increase the gain when the level of the audio output signal 318 is low and to decrease the gain when the level of the audio output signal 318 is high, but the gain adjustment may be temporarily disabled when speech is not present. Disabling of the gain adjustment in this case may prevent noise from being amplified.

In accordance with some embodiments, the jitter delay control circuit 310 may receive from the level estimation and active voice detector block 316 a signal or signals indicative of characteristics of the packet currently being decoded (as reflected by the output of the decoder 312). The characteristics, which may be detected by the level estimation and active voice detector block 316, may include whether the packet is a speech packet or a silence packet, whether the packet is a low level noise packet, or whether the packet is a low level speech packet (i.e., speech at a volume level that is below a predetermined threshold). In other embodiments, the level estimation and active voice detector block 316 may only indicate to the jitter delay control circuit 310 that the current packet is a silence packet, or may only indicate to the jitter delay control circuit 310 that the current packet is a silence packet or a low level noise packet. In response to the packet characteristic detected by the level estimation and active voice detector block 316, the jitter delay control circuit 310 may determine whether or not to drop the current packet.

Figure 4:
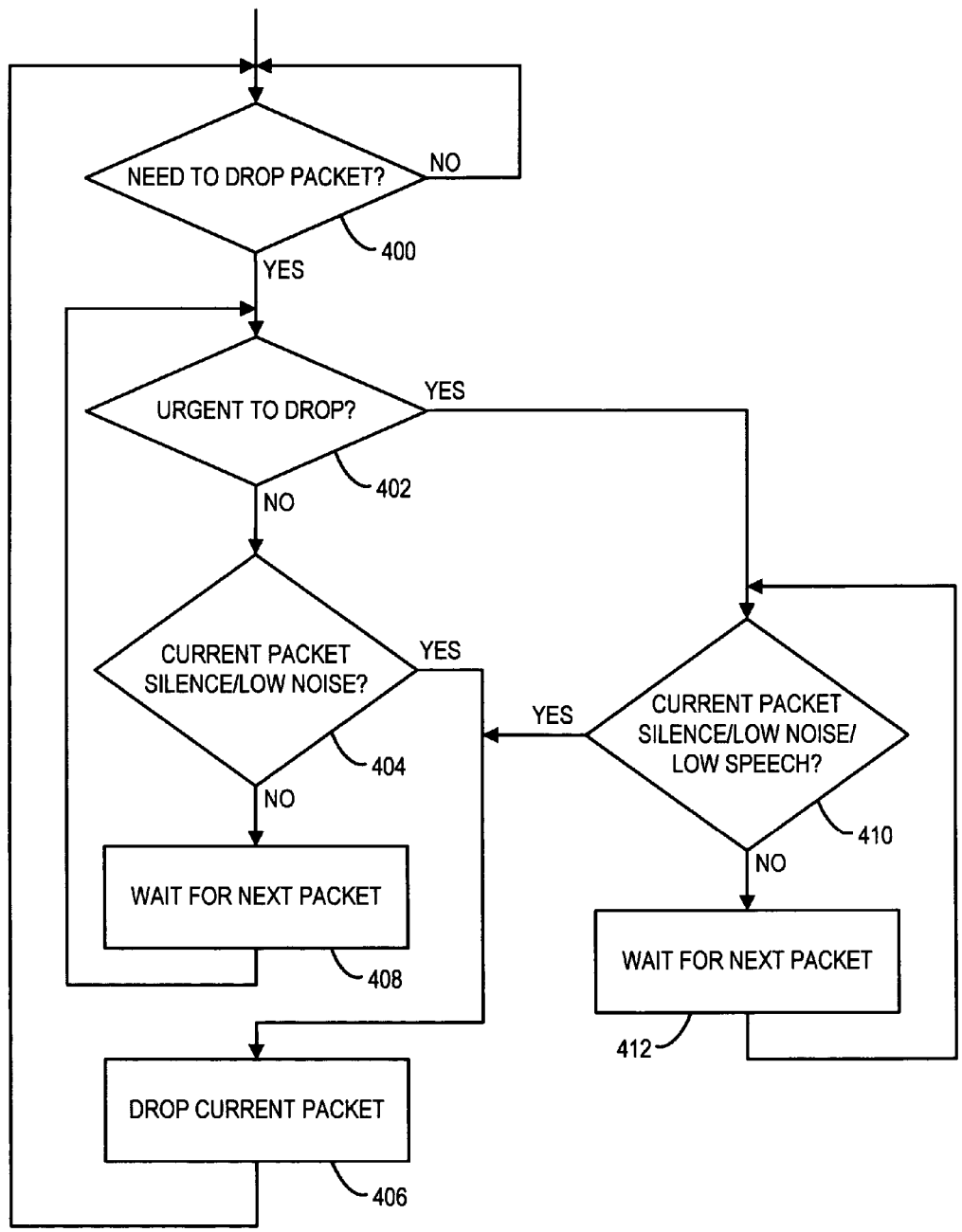
FIG. 4 is a flow chart that illustrates a process performed in a receiver that is part of the VoP network connection of FIG. 3.

FIG. 4 is a flow chart that illustrates a process that may be carried out by the receiver 304 (and particularly by the jitter delay control circuit 310) in accordance with some embodiments.

As indicated at 400 in FIG. 4, the receiver 304 (e.g., the jitter delay control circuit 310) may determine whether it is currently necessary to drop one or more of the received voice signal data packets. If so, it may next be determined at 402 whether dropping of a packet is urgently needed. For example, the determination at 402 may include determining whether a pre-determined period has timed out, without dropping of a packet, since it was determined at 400 that dropping a packet was necessary.

If a negative determination is made at 402, then a determination indicated at 404 is made. At 404 it is determined whether the level estimation and active voice detector block 316 is signaling that the current packet is a silence packet or a low level noise packet. If a positive determination is made at 404 (i.e., if the current packet is either a silence packet or a low level noise packet), then the jitter delay control circuit 310 may operate so that the current packet is dropped (as indicated at 406). For example, the jitter delay control circuit 310 may control the jitter buffer 308 so that the next packet after the current packet is immediately read out from the jitter buffer 308 to the decoder 312. This may effectively overwrite the current packet, thereby causing, potentially, most of the current packet not to be decoded.

After dropping the current packet, the process of FIG. 4 may loop back to 400.

If a negative determination is made at 404 (i.e., if it is determined that the current packet is neither a silence packet nor a low level noise packet), then the jitter delay control circuit 310 may wait for the next packet, as indicated at 408, and the process of FIG. 4 may effectively loop back to 402.

If a positive determination is made at 402 (i.e., if the need to drop a packet is urgent), then a determination indicated at 410 may be made. At 410 it is determined whether the level estimation and active voice detector block 316 is signaling that the current packet is any one of a silence packet, a low level noise packet, or a low level speech packet. If a positive determination is made at 410, then the current packet may be dropped per 406, and the process of FIG. 4 may loop back to 400. If a negative determination is made at 410 (i.e., if it is determined that the current packet is neither a silence packet, nor a low level noise packet, nor a low level speech packet), then the jitter delay control circuit 310 may wait for the next packet, as indicated at 412, and the process of FIG. 4 may loop back to 410.

By selecting silence packets or other suitable packets for dropping, the receiver 304 may operate so as to minimize or eliminate glitches in the output audio signal, thereby improving the perceived audio quality provided by the receiver.

Again, it will be appreciated that the transmitter 302 may be part of a device (not separately shown) which also includes a receiver like the receiver 304, and the receiver 304 may be part of a device (not separately shown) which includes a transmitter like the transmitter 302, so that a two-way telephone connection may be made.

In some embodiments, a VoP receiver may be provided which is able to select packets for dropping both in accordance with the technique described with reference to FIGS. 1 and 2 and in accordance with the technique described with reference to FIGS. 3 and 4. Such a receiver may switch between the two techniques. For example, the receiver may use the voice activity marker bit detection technique when the transmitter is able to provide the required voice activity marker bits, but may switch over to use the ALC-based technique in cases where the transmitter is not able to provide the required voice activity marker bits.

Figure 5:
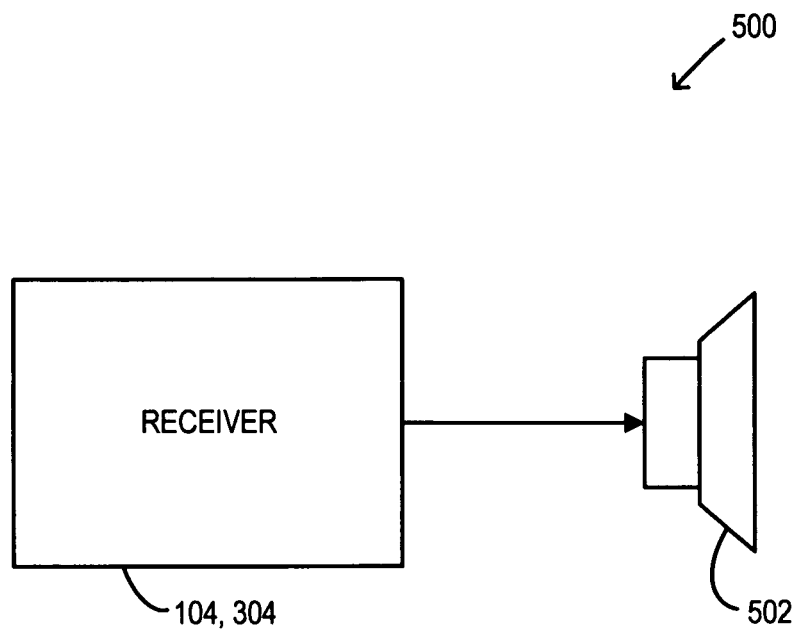
FIG. 5 is a block diagram of a system that includes a receiver such as those shown in FIG. 1 or FIG. 3.

FIG. 5 is a block diagram of a system 500 that includes a receiver 104 or a receiver 304 such as those described above in connection with FIGS. 1-4. In the system 500, the output of the receiver 104 or 304 is coupled to drive a speaker 502 to audibly reproduce the audio output signal. It will be appreciated that buffers, amplifiers and the like, though not shown in the drawing, may be present between the receiver 104 or 304 and the speaker 502.

The techniques disclosed herein for selecting packets to be discarded may be applied in any IP (Internet Protocol) voice communication device, including, but not limited to, media gateways, IP telephones, media servers, Wi-Fi telephones and any device that uses RTP (Real-Time Protocol) for voice communication.

In at least some of the embodiments described above, at least some components (e.g., the jitter delay control circuit 118, FIG. 1) may be constituted by one or more general purpose processors (not separately shown) and/or digital signal processors (not separately shown) coupled to one or more program memories and or other storage devices. The program storage device(s) may store software and/or firmware instructions that control the processor(s) to perform the above-described functions of the components in question.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising: receiving at a receiver a voice signal in the form of a sequence of data packets; using an automatic level control component of the receiver to detect that one of the received packets is a silence packet or a noise packet; receiving at a jitter delay control circuit from the automatic level control component a signal or signals to indicate that the one of the received packets is a silence or a noise packet; determining whether dropping of the one of the received packets is urgently needed, wherein the determining includes whether a pre-determined period has timed out without the dropping of the one of the received packets since the one of the received packets was determined that dropping the one of the received packets was necessary; and dropping the one of the received packets in response to the signal or signals received from the automatic level control component; wherein said automatic level control component includes a gain adjustment block and a level estimation and active voice detector block, said gain adjustment block controlled by the level estimation and active voice detector block to adjust a gain applied by the gain adjustment block to an audio signal, said level estimation and active voice detector block of said automatic level control component being used to detect that one of the received packets is a silence packet or a noise packet.

2. The method of claim 1, further comprising: generating an audio output from the received sequence of data packets less the dropped one of the packets.

3. An apparatus comprising: a buffer to receive and store a sequence of data packets that represents a voice signal; a decoder coupled to the buffer to receive the sequence of data packets and to convert the sequence of data packets to an audio output signal; an automatic level control (ALC) component coupled to the decoder to: selectively apply a gain adjustment to the audio output signal; detect that one of the received packets is a silence packet or a noise packet; generate a signal or signals to indicate that the one of the received packets is a silence packet or a noise packet; determine whether dropping of the one of the received packets is urgently needed, wherein the determine includes whether a pre-determined period has timed out without the dropping of the one of the received packets since the one of the received packets was determined that dropping the one of the received packets was necessary; and a jitter delay control circuit coupled to the ALC component and to the buffer to receive the signal or signals generated by the ALC component and to selectively drop the one of the received packets in response to the signal or signals received from the ALC component; wherein said automatic level control component includes a gain adjustment block and a level estimation and active voice detector block, said gain adjustment block controlled by the level estimation and active voice detector block to adjust a gain applied by the gain adjustment block to the audio output signal, said level estimation and active voice detector block of said automatic level control component being used to detect that one of the received packets is a silence packet or a noise packet.

4. A system comprising: a receiver to receive a sequence of data packets that represents a voice signal; and a speaker coupled to the receiver to audibly reproduce the voice signal; wherein the receiver includes: a buffer to receive and store the sequence of data packets; and a decoder coupled to the buffer to receive the sequence of data packets and to convert the sequence of data packets to an audio output signal; an automatic level control (ALC) component coupled to the decoder to: selectively apply a gain adjustment to the audio output signal; detect that one of the received packets is a silence packet or a noise packet; generate a signal or signals to indicate that the one of the received packets is a silence packet or a noise packet; determine whether dropping of the one of the received packets is urgently needed, wherein the determine includes whether a pre-determined period has timed out without the dropping of the one of the received packets since the one of the received packets was determined that dropping the one of the received packets was necessary; and a jitter delay control circuit coupled to the ALC component and to the buffer to receive the signal or signals generated by the ALC component and to selectively drop the one of the received packets in response to the signal or signals received from the ALC component; wherein said automatic level control component includes a gain adjustment block and a level estimation and active voice detector block, said gain adjustment block controlled by the level estimation and active voice detector block to adjust a gain applied by the gain adjustment block to the audio output signal, said level estimation and active voice detector block of said automatic level control component being used to detect that one of the received packets is a silence packet or a noise packet.

\* \* \* \* \*